May 25, 1965 M. J. BOZICH 3,185,434
CONVEYING SYSTEM AND VALVE CONSTRUCTION THEREFOR
Filed Feb. 28, 1962 4 Sheets-Sheet 1

INVENTOR.
MICHAEL J. BOZICH.
BY
Murray & Young
his ATTORNEYS.

INVENTOR.
MICHAEL J. BOZICH.
BY Murray & Young.
his ATTORNEYS.

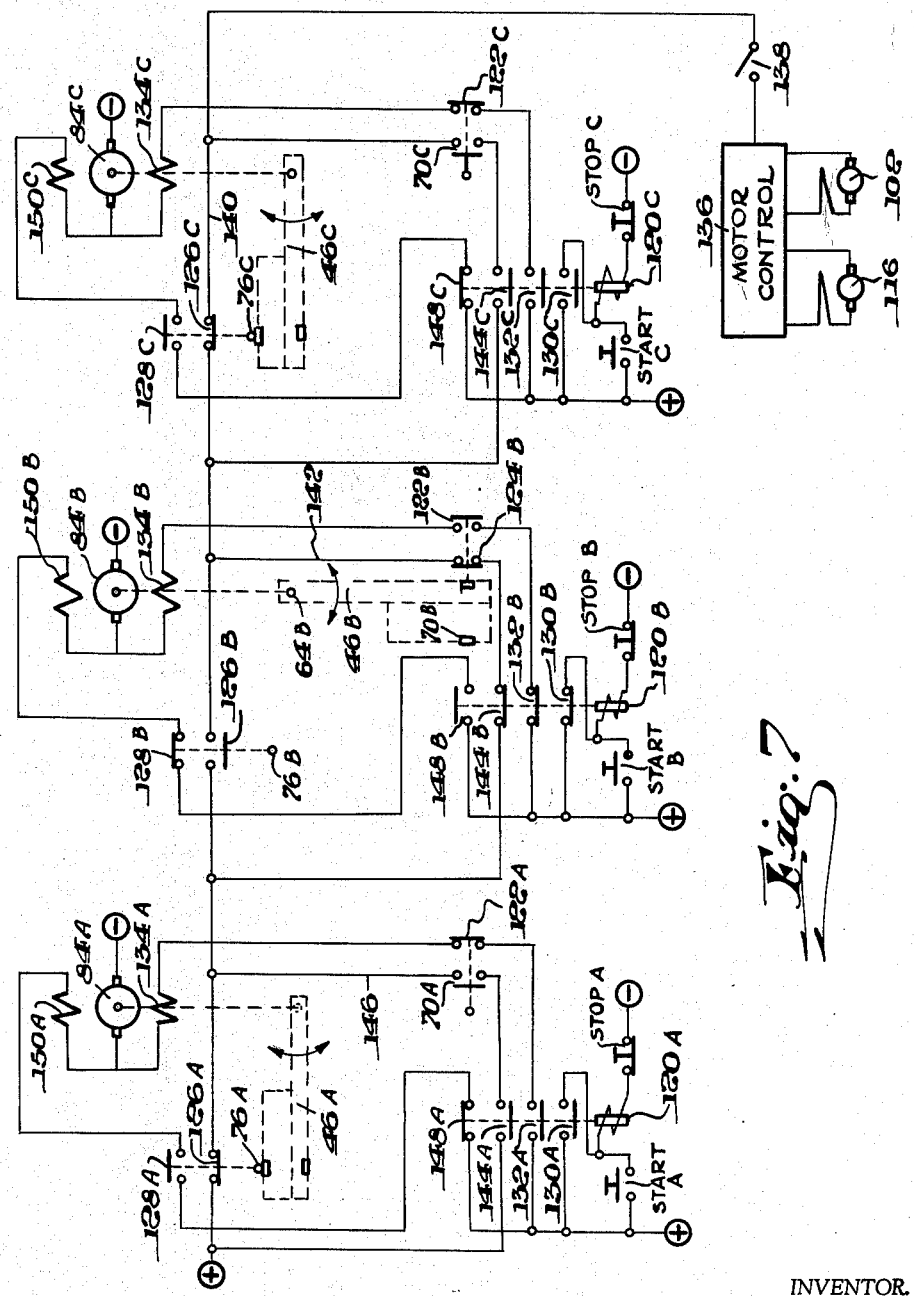

United States Patent Office //
3,185,434
Patented May 25, 1965

3,185,434
CONVEYING SYSTEM AND VALVE
CONSTRUCTION THEREFOR
Michael J. Bozich, 1059 Bay Ridge Ave., Pittsburgh, Pa.
Filed Feb. 28, 1962, Ser. No. 176,234
3 Claims. (Cl. 251—134)

This invention relates to pneumatic conveying systems for granular material and the like, and more particularly to a diverting valve for a pneumatic conveying system which is usable for selectively directing a flow of material conveyed through a main conduit into a branch conduit leading to a storage bin or the like.

In systems for conveying solid materials such as granular ingredients which are highly abrasive, it is necessary to maintain the conveying system as streamlined as possible in order to reduce the effects of abrasion on the conveying system in general and the valve structures for controlling discharge in particular. Furthermore, it is also important to provide a number of different outlets so that the material being conveyed can be discharged at any one of several different locations. For example, these locations can be a series of bins for storage, reaction chambers, tank cars, trucks or the like.

It is an object of the present invention to provide a conveying system in which solid material can be transmitted under pneumatic pressure or the like and can be discharged into any one of several different locations by means of a novel system of interrelated diverting valve means.

It is a further object of the invention to provide a plurality of independently operated diverting valves each of which is effective to control the point of discharge of material transferred within a conduit, said devices being so related that the efficiency of the conveying system is not substantially affected. That is, the selectively and independently operable valves of the invention are not a source of substantial power loss.

A further object of the invention is to provide a novel control system which prevents the possibility of discharging material into the wrong location, this being accomplished by means of a novel control system combined with the valve arrangement.

A further object of the invention is to provide a diverting valve system in which the main flow of material is opposed at the point of discharge by a gaseous flow which is equal in pressure to the main flow and is provided in volume sufficient to effect adequate diversion, the specific rate of flow of the opposing gas being selected in accordance with the material and abrasive qualities thereof which are being discharged.

A novel feature of the invention is that regardless of the number of valves, diverting air is used at the point of discharge of only one valve so that its quantity will not change regardless of the number of valves in the conveying system.

Other objects and features of the invention will become apparent from a consideration of the following description which proceeds with reference to the accompanying drawings, wherein:

FIG. 4 is a detailed view of the valve construction and support arm therefor;

FIG. 5 is a cross-sectional view taken along line V—V of FIG. 4;

FIG. 6 is a schematic illustration of the action of a secondary air source in diverting finely divided material through the valve of the invention; and FIG. 7 is a schematic wiring diagram illustrating how the diverting valves are electrically interconnected to prevent accidental discharge of the material through the wrong discharge opening.

Figure 1:
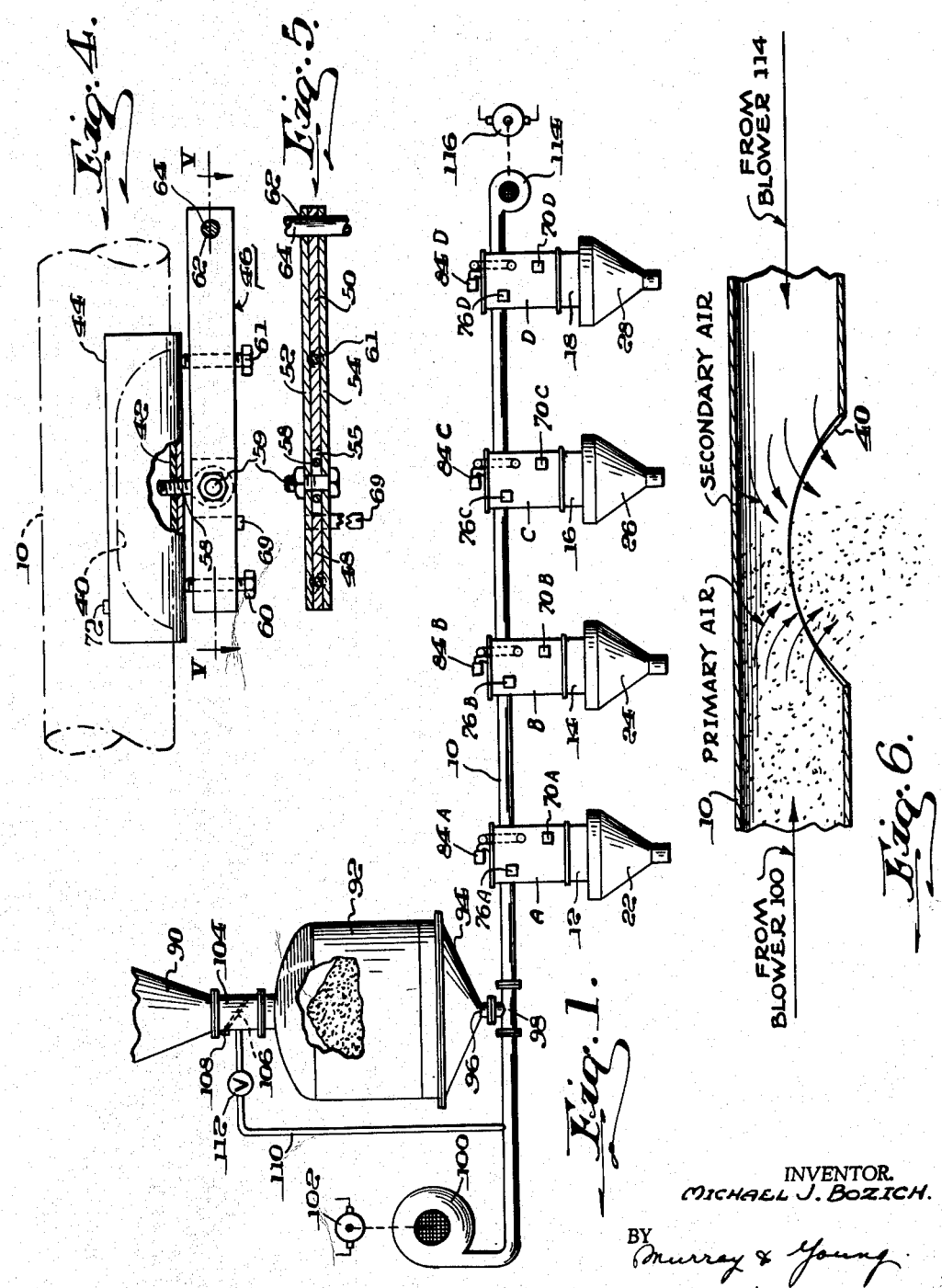
FIGURE 1 is a schematic view of a conveying system having a main distribution conduit and four outlets each having an associated diverting valve so that the material within the conduit can be discharged through a preselected one of the outlets, the outlets in this case being storage bins.

Referring now to the drawings, and specifically to FIG. 1, there is provided a pneumatic conveying conduit 10 of steel or the like which is suitable for conducting the conveyed material, such as crushed pulverulent material, along the length of the conduit under the action of pneumatic pressure. The material passes continuously through the conduit at a rate and pressure sufficient to carry the conveyed material therewith. The material flows at a rather high velocity, as for example 5,000–8,000 lineal feet per minute and has an abrasive effect upon the conduit which dictates as nearly a streamlined construction as possible.

At spaced intervals along the length of the conduit are valve assemblies designed generally by reference letters A, B, C and D, all of which are of substantially the same construction and serve to selectively divert the flow of material within the distributing conduit into storage bins 22, 24, 26 and 28. Although only four valves are shown herein, there is no practical limitation on the number of diverting valve mechanisms which can be provided along the length of the conduit since the valves are not a source of pressure loss nor do they present any substantial obstruction to flow. In other words, the valves do not require any substantial increase in pressure for the primary air flow.

The diverting valves are usable not only for directing the flow of material into storage bins, but can also be used for channeling the material into reaction chambers, other conveying systems, or the like. It is a characteristic of each of the valve assemblies that its construction is streamlined so as not to obstruct the passage of material in the conduit and to prevent wear under the action of the conveyed material passing the valve to a succeeding valve which might be open.

Figure 2:
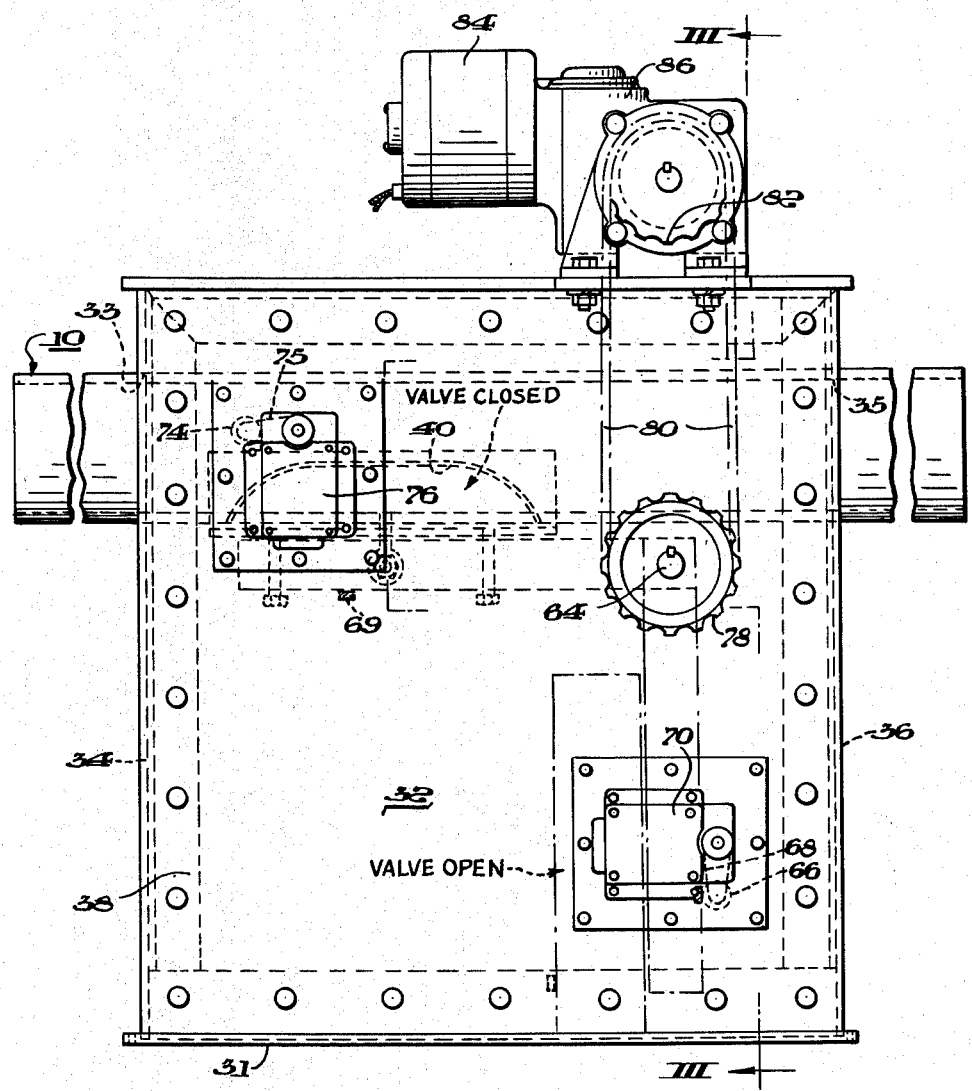
FIG. 2 is an enlarged side elevational view of the diverting valve arrangement of the invention showing the enclosure which houses the valve, the valve itself being shown in its closed and open positions within the enclosure by broken lines.
Figure 3:
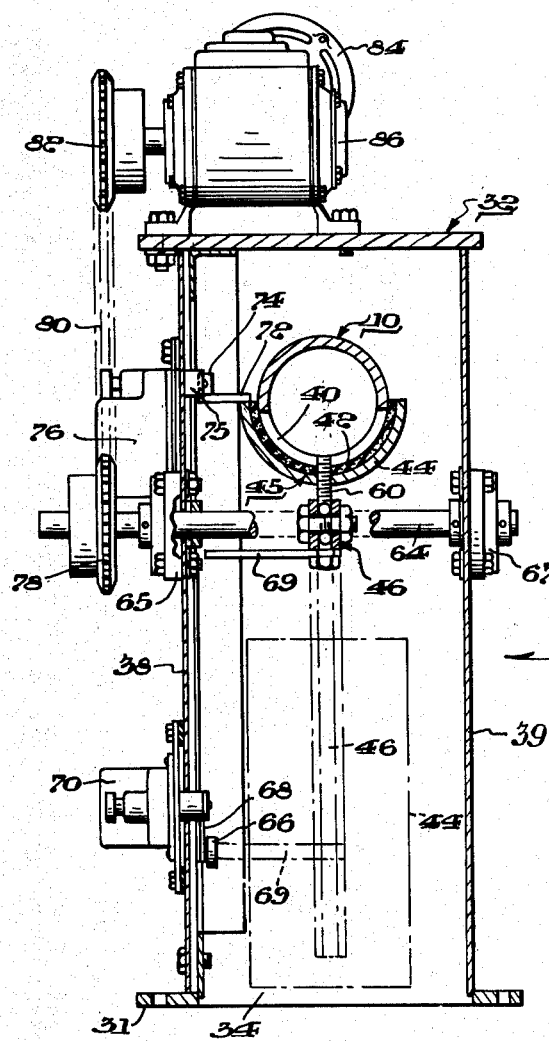
FIG. 3 is a sectional view taken substantially along line III—III of FIG. 2.

Referring now to FIGS. 2 and 3, each valve is housed within a box section casing 32 having end walls 34 and 36 including openings 33 and 35 through which the pneumatic conduit 10 passes, and side walls 38 and 39 which provide a supporting surface for the valve and valve actuator. The portion of the conduit 10 within box assembly 32 is provided with a discharge opening 40 in its lower side through which material conveyed within conduit 10 is discharged into the box assembly 32. As shown, the box assembly 32 has an open bottom provided with a flange 31 which, in turn, is connected to the periphery of a conduit 22, 24, 26 or 28 (FIG. 1) leading to an associated storage bin or the like, or to an opening in the storage bin itself. The opening 40 is covered by an appropriate gasket 42 (FIGS. 3 and 4) which forms a pneumatic seal around the edges of opening 40 to prevent any of the conveyed material from leaving the conduit 10 and also to prevent any presure drop of the primary pneumatic pressure.

The gasket 42 has a similarly shaped backing 44 which reinforces the resilient gasket 42 and holds it against the surface of the conduit 10 surrounding the elliptical opening 40. The combination of seal 42 and backing 44 constitutes the functional portion of the valve, and is referred to as a "flap valve" 45. The flap valve 45 is carried by a support arm 46 which, as best shown in FIGS. 4 and 5, comprises spaced bars 48 and 50 sandwiched between bars 52 and 54 to provide an opening 55 for the reception of an eyebolt 58, the eyebolt being held in position by means of a bolt 59. The valve support arm is apertured at 62 to receive a shaft 64 which is journaled at its opposite ends in bearings 65 and 67 (FIG. 3) carried on walls 38 and 39 of the casing 32. The backing 44 and gasket 42 are carried on the eyebolt 58 as shown in FIG. 4 such that the entire assembly can be adjustably rotated about the axis of the bolt 59 by turning the adjusting bolts 60 and 61 which are treaded into, and extend through, the support arm 46. As will be understood, the combination of eyebolt 58 and the bolts 60 and 61 provide a means for adjusting the position of the backing 44 so that the sealing portion or gasket 42 is urged snugly against the conduit 10 to effect a tight sealing pressure therewith.

Projecting outwardly from one side of the support arm 46 is a bar 69 which, when the support arm is disposed vertically as shown in dotted line position in FIG. 3, engages a cam 66 to effect rotation of the switch arm 68 and thereby actuate limit switch 70. When the arm 46 is in its normal horizontally disposed position, as shown in full lines in FIG. 3, an arm 72 on the backing 44 engages cam 74 to rotate switch arm 75 and actuate limit switching 76. As will be seen, these two limit switches 70 and 76 are related so that the operation of the valve assembly will not divert a flow of the material being conveyed within the conduit 10 to the wrong location. The valve is operated between a closed horizontal position and vertical open position by means of the shaft 64 which is driven by a sprocket wheel 78 having a drive chain connection 80 with a sprocket wheel 82, this latter sprocket being driven by motor 84 through a gear reducer 86 mounted on top of the casing 32.

The material is fed into the conduit 10 by apparatus of the general type shown in U.S. Patent No. 2,565,946 or copending application Serial No. 120,719, filed June 29, 1961. As shown in FIG. 1, such apparatus consists of a pair of hoppers 90 and 92 arranged vertically one above the other. Only the lower portion of the upper hopper 90 is shown, it being understood that this hopper is provided with an open top to permit granular or powdered material to be poured therein. The lower hopper 92, designated as a delivery hopper, is provided with a funnel-shaped bottom 94 having an opening 96 leading into a T-section pipe 98 which, at its right-hand end is connected to the conveying conduit 10 that conveys material to the valves A–D. The left end of the T-section pipe 98 is connected, as shown, to a blower 100 of any standard construction, the power for such blower being supplied by an electric motor 102.

Interconnecting the hoppers 90 and 92 is a section 104 having a flap 106 therein which is pivotally connected to section 104 as at 108. Under normal conditions, the flap 106 will rotate downwardly about pivot point 108 to permit the material from hopper 90 to flow into hopper 92. When, however, an air blast is introduced into section 104 through conduit 110, air pressure will build up above the material in hopper 92 to rotate the flap 106 upwardly into the position shown such that it will block off the passageway between hoppers 90 and 92 and shut off the supply of material to hopper 92. Air under pressure may be supplied to section 104 to rotate the flap 106 upwardly by means of a valve 112 in the conduit 10, the arrangement being such that when valve 112 is open air under pressure will be supplied to section 104 from the blower 100. At the end of conduit 10 opposite the blower 100 is a second, smaller blower 114 which is driven by means of motor 116. As will be seen, the blower 114 provides a pressure which opposes that produced by blower 100, this second source of air serving to divert material being conveyed from the main conduit 10 and through any one of the valves A–D which is open into its associated storage bin 22–28.

It will be understood by reference to FIGS. 2 and 3 that when any valve is closed with the gasket 42 in sealing engagement with the opening 40, granular or the like material in conduit 10 will pass over the opening 40 and onto a succeeding valve. However, when the valve is open (i.e., the dotted line position shown in FIGS. 3 and 4), material will continue through the valve to a point directly above the opening 44. At this point, the pressure from blower 114 will stop the movement of both the conveyed material and the primary air from blower 100 which accomplishes the pneumatic conveying; and with the valve open and the opening 44 being the line of least resistance, the entire mass of material and air will fall downwardly through the valve opening 44 and into a storage bin or the like. For the successful operation of the valve, air of sufficient quantity and pressure is required to do the actual diverting. This action is best illustrated in FIG. 6. In this respect, the pressure of the secondary air from blower 114 must be equal to the pressure of the primary air from blower 100 and the material conveyed thereby. The volume of secondary air, however, can be varied and this depends upon the requirements of the particular conveying system. Tests have shown that diverting can be accomplished with volumes as low as 10% of the conveying air and up to 100% or equal to the conveying air. These rates will vary according to the material to be conveyed and the abrasive qualities of this same material.

It will be appreciated that all valves except the one leading to the desired storage bin must be closed for the successful operation of the system. In this respect, air for diverting is required only at the one particular valve which is open such that the pressure of the secondary air from blower 114 and its quantity will not change no matter how many valves are in the main conveying line 10.

It is characteristic of granular material transported under high pneumatic pressure to have an abrasive effect on the conduit and other operating portions of the system which are exposed to the flow of material. Since each of the valves, when closed, is of streamlined contour along the interior of the conduit, the abrasive effect is substantially reduced, thereby minimizing the principal source of wear in the system. At the same time, this streamlined effect also prevents appreciable pressure drops which detract from the efficiency of the system.

There is no practical limitation in the number of outlets which can be provided in this system. Four outlets are specifically shown but this can be increased to ten, fifteen or any other number. There is no limitation on the class of material being transported other than it must be capable of flow movement under pneumatic force.

As was mentioned above, the successful operation of the system shown in FIG. 1 depends upon only one of the valves A–D being open while the others are closed. The limit switches 70 and 76 on each valve, when properly placed and electrically interconnected will assure that if the valves are not in their desired positions the system will not start, thereby eliminating the possibility of discharging material into the wrong storage bin.

One illustrative type of electrical control system for achieving the foregoing is shown in FIG. 7 wherein the control circuits for the valves A, B and C only are shown, it being understood that this may be extended to any desired number. With reference to FIG. 7, it will be noted that the relay 120A, 120B or 120C is provided for each of the valves. In the case of Valve B, the arm 46B is shown in its downwardly extending or open position; whereas in the case of valves A and C the arms 46A and 46C are shown in their closed positions. With the arm 46B in the open position, it will engage the limit switch 70B to open its normally closed contacts 122B while closing its normally open contacts 124B. At this time, the limit switch 76B will be in a position where its contacts 126B are open while contacts 128B are closed.

Let us assume, for example, that it is desired to discharge material into the storage bin beneath valve B. Under these circumstances, the push button identified "start B" will be depressed, thereby momentarily energizing the coil on relay 120B. When relay 120B is energized, its contacts 130B pull in or close to provide a holding circuit for the coil on relay 120B through the normally closed stop push button identified as "stop B." When the "start B" button is initially depressed, the arm 46B will be rotated upwardly from the position shown in FIG. 6. wherein contacts 126B are closed and contacts 128B are open on limit switch 76B. In addition, contacts 124B on limit switch 70B will be open while contacts 122B will be closed. Consequently, when the "start B" button is depressed and relay 120B energized, contacts 132B close as shown to complete a circuit through contacts 122B, which are now closed, to one winding 134B on direct current motor 84B. This causes the motor to drive the shaft 64B and rotate the arm 46B in a counter-clockwise direction as viewed in FIG. 7. This rotation of the arm 46B will continue until it strikes the limit switch 70B to open contacts 122B, whereupon the circuit to motor 84B is broken and the motor stops.

The motors 102 and 116 for blowers 100 and 114, respectively, are controlled by a motor control circuit 136. This control circuit will be actuated to start the motors 102 and 116 when start switch 138 is closed and when only one of the valves A, B or C is open while the other valves are closed. Thus, the motor control circuit 136 will be actuated through switch 138, lead 140, contacts 126C on limit switch 76C which are now closed since the arm 46C is raised, lead 142, contacts 124B on limit switch 70B which are now closed since arm 46B is now lowered with the valve open, contacts 144B on relay 120B which are now closed since the relay is energized, lead 146 and contacts 126A on limit switch 76A. In this manner, it can be seen that the motors 102 and 116 will start to initiate the conveying operation after "start B" push button is depressed when, and only when, the valve B is in its open position while the other valves are all closed. That is, if either of the contacts 126A or 126C is open indicating that its associated valve is open, the circuit cannot be completed to control circuit 136 to start the motors. Thus, the system eliminates the possibility of discharging material into the wrong storage bin.

When it is desired to close the valve B, the push button identified as "stop B" will be depressed, thereby breaking the holding circuit for the coil on relay 120B and deenergizing this relay. When the relay 120B deenergizes, the circuit to the motor control circuit 136 is broken through contacts 132B on relay 120B so that the motors 102 and 116 stop. At the same time, the contacts 148B on relay 120B will now close to energize the other winding 150B on motor 84B through contacts 128B on limit switch 176B which are now closed since the arm 46B is in its downwardly-extending position. Consequently, the motor 84B will now rotate in the opposite direction to rotate the arm 46B in a clockwise direction as viewed in FIG. 6 until the limit switch 76B is engaged to close contacts 126B and open contacts 128B, whereupon the motor 84B stops preparatory to a succeeding cycle of operation. In the particular circuit shown herein, it is, of course, necessary to open switch 138 before all of the limit switches 76A, 76B and 76C are engaged by their associated arms to prevent the motors 102 and 116 from operating when all valves are closed. As will be understood, this may be accomplished automatically, the circuit shown herein being for illustrative purposes only.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A valve for a pneumatic conveying system comprising a conduit through which finely divided material is pneumatically conveyed, an opening in the bottom of said conduit, cover means for said conduit comprising a backing plate having a contour shaped to conform to the contour of said conduit, a resilient gasket carried by the backing plate and also shaped to conform to the contour of the conduit whereby the gasket may be forced into sealing engagement over said opening, axle means rotatable about a generally horizontal axis, an arm having one end connected to said axle means, means pivotally connecting said backing plate and the gasket carried thereby to the other end of said arm whereby the backing plate may be pivotally adjusted on said arm about an axis extending parallel to the axis of said axle means, set screw means on said arm positioned on either side of the pivotal connection of the backing plate to the arm whereby a fixed angular position of the backing plate with respect to the arm may be varied by turning said set screw means, and means for turning said axle means to rotate said arm and the backing plate carried thereby from a position where the arm is generally horizontal with the gasket covering said opening to a position where the arm hangs down from the axle means in a generally vertical position.

2. A valve for a pneumatic conveying system comprising an enclosure having an open bottom, a conduit extending through the upper portion of said enclosure and adapted to pneumatically convey finely divided material therethrough, an opening in the bottom of said conduit within said enclosure, cover means for said conduit comprising a member having a contour shaped to conform to the contour of said conduit whereby the member is adapted to fit over and cover said opening in sealing engagement with the conduit, an axle extending between side walls of said enclosure and rotatable about a generally horizontal axis beneath the conduit, an arm having one end connected to said axle and another end connected to said member, and means for turning said axle to rotate said arm and the member carried thereby within said enclosure from a position where the arm is generally horizontal with the member covering said opening to a position where the arm hangs down in the enclosure from the axle in a generally vertical position to permit the granular material to fall through said opening and into the enclosure.

3. A valve for a pneumatic conveying system comprising an enclosure having an open bottom, a conduit extending through the upper portion of said enclosure and adapted to pneumatically convey finely divided material therethrough, an opening in the bottom of said conduit within said enclosure, cover means for said conduit comprising a member having a contour shaped to conform to the contour of said conduit whereby the member is adapted to fit over and cover said opening in sealing engagement with the conduit, an axle extending between side walls of said enclosure and rotatable about a generally horizontal axis beneath the conduit, an arm having one end connected to said axle and another end connected to said member, means for turning said axle to rotate said arm and the member carried thereby within said enclosure from a first position where the arm is generally horizontal with the member covering said opening to a second position where the arm hangs down in the enclosure from the axle in a generally vertical position to permit the finely divided material to fall through said opening and into the enclosure, first switch means actuable when said member is at said first position to deenergize said means for turning said axle, second switch means actuable when said member is at said second position to deenergize said means for turning said axle, and circuit means interconnecting said first and second switch means and said means for turning said axle and including third switch means for energizing said means for turning said axle to move said member from said first position to said second position and vice versa.

References Cited by the Examiner

UNITED STATES PATENTS

| | | | |
|---|---|---|---|
| 971,458 | 9/10 | McCleary | 251—145 |
| 1,394,207 | 10/21 | Medine | 251—145 |
| 1,941,190 | 12/33 | Schneider | 302—28 |
| 2,365,927 | 12/44 | Allen | 251—134 X |
| 2,380,311 | 7/45 | Hornbrook | 302—28 |
| 2,438,245 | 3/48 | Gregg | 137—592 X |
| 2,647,539 | 8/53 | Stearns | 251—145 |
| 2,790,309 | 4/57 | Wenzelberger | 251—299 X |
| 3,037,737 | 6/62 | Konemund | 251—299 X |

M. CARY NELSON, *Primary Examiner.*

ANDRES H. NIELSEN, *Examiner.*